(12) United States Patent
Carter et al.

(10) Patent No.: US 11,522,946 B2
(45) Date of Patent: *Dec. 6, 2022

(54) DISTRIBUTED FARMING SYSTEM AND COMPONENTS THEREOF

(71) Applicant: Smallhold, Inc., Brooklyn, NY (US)

(72) Inventors: Andrew Carter, Brooklyn, NY (US); Adam DeMartino, Brooklyn, NY (US); Louis Calderone, Oakdale, NY (US)

(73) Assignee: Smallhold, Inc., Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/319,548

(22) Filed: May 13, 2021

(65) Prior Publication Data

US 2021/0266357 A1    Aug. 26, 2021

Related U.S. Application Data

(63) Continuation of application No. 16/048,965, filed on Jul. 30, 2018, now Pat. No. 11,038,949.

(Continued)

(51) Int. Cl.
| | |
|---|---|
| *G06F 15/16* | (2006.01) |
| *H04L 67/10* | (2022.01) |
| *G06F 8/65* | (2018.01) |
| *A01G 9/24* | (2006.01) |
| *A01G 7/00* | (2006.01) |
| *A01G 31/06* | (2006.01) |

(Continued)

(52) U.S. Cl.
CPC ............... *H04L 67/10* (2013.01); *A01G 7/00* (2013.01); *A01G 9/24* (2013.01); *A01G 9/246* (2013.01); *A01G 31/06* (2013.01); *G06F 8/65* (2013.01); *H04L 67/55* (2022.05); *H04L 67/12* (2013.01); *Y02A 40/25* (2018.01)

(58) Field of Classification Search
CPC ......... H04L 67/10; H04L 67/26; H04L 67/12; A01G 7/00; A01G 9/24; A01G 9/246; A01G 31/06; G06F 8/65
USPC .......................................................... 709/217
See application file for complete search history.

(56) References Cited

U.S. PATENT DOCUMENTS

9,792,557 B2 * 10/2017 Mathur ................... G06Q 50/02
9,854,750 B2 *  1/2018 Brusatore .............. A01G 22/00
(Continued)

FOREIGN PATENT DOCUMENTS

WO      2017085557       5/2017
WO   WO-2017085557 A1 *  5/2017  .......... A01G 25/162

*Primary Examiner* — Alicia Baturay
(74) *Attorney, Agent, or Firm* — Ryan, Mason & Lewis, LLP

(57) ABSTRACT

Methods, apparatus, systems and processor-readable storage media for distributed farming are provided herein. A computer-implemented method includes facilitating transfer of one or more substrates and one or more crops at approximately a given stage of a growth cycle, from (i) a first location to (ii) one or more growing units, wherein the given stage of the growth cycle comprises a stage prior to completion of the growth cycle; processing data, captured via multiple sensors within the one or more growing units, wherein the data comprise (i) data pertaining to at least one of the one or more substrates and the one or more crops, and (ii) data pertaining to the one or more growing units; and performing one or more automated actions based at least in part on the processing of the data.

20 Claims, 6 Drawing Sheets

Related U.S. Application Data

(60) Provisional application No. 62/539,098, filed on Jul. 31, 2017.

(51) Int. Cl.
  *H04L 67/55* (2022.01)
  *H04L 67/12* (2022.01)

(56) References Cited

U.S. PATENT DOCUMENTS

| | | | |
|---|---|---|---|
| 9,980,427 B2 * | 5/2018 | Chan | A01C 11/02 |
| 10,136,592 B2 * | 11/2018 | Broutin Farah | A01G 7/06 |
| 10,314,251 B2 * | 6/2019 | Gagne | A01G 9/247 |
| 11,038,949 B2 * | 6/2021 | Carter | G06F 8/65 |
| 2014/0366443 A1 | 12/2014 | Brusatore | |
| 2015/0305258 A1 | 10/2015 | Broutin Farah et al. | |
| 2016/0088802 A1 * | 3/2016 | Nicole | H05B 47/11 315/297 |
| 2016/0202227 A1 | 7/2016 | Mathur et al. | |
| 2016/0309644 A1 | 10/2016 | Chan et al. | |
| 2018/0325050 A1 * | 11/2018 | Bye | A01G 25/162 |
| 2019/0037006 A1 * | 1/2019 | Carter | A01G 31/06 |
| 2020/0037520 A1 * | 2/2020 | Motycka | G05B 13/0265 |
| 2020/0137964 A1 * | 5/2020 | Bouchard | H04W 4/80 |
| 2020/0184153 A1 * | 6/2020 | Bongartz | G06N 5/04 |

* cited by examiner

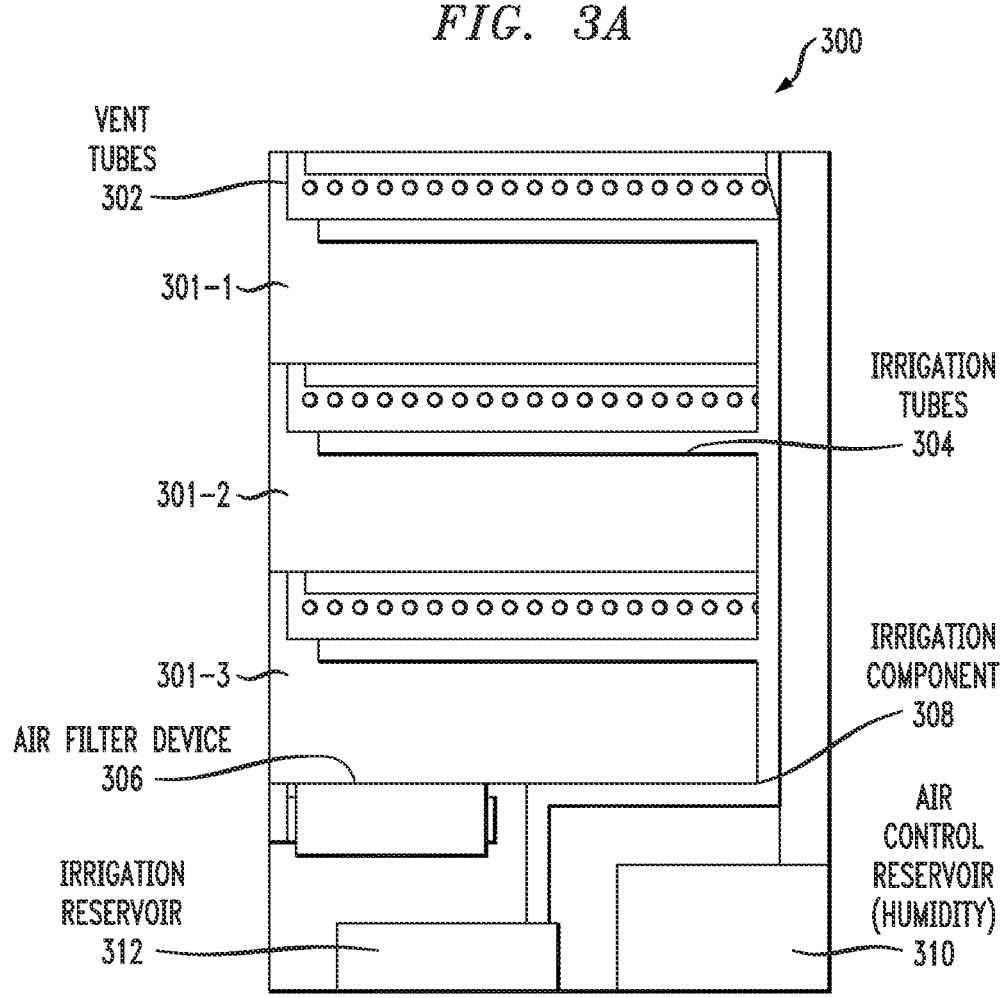

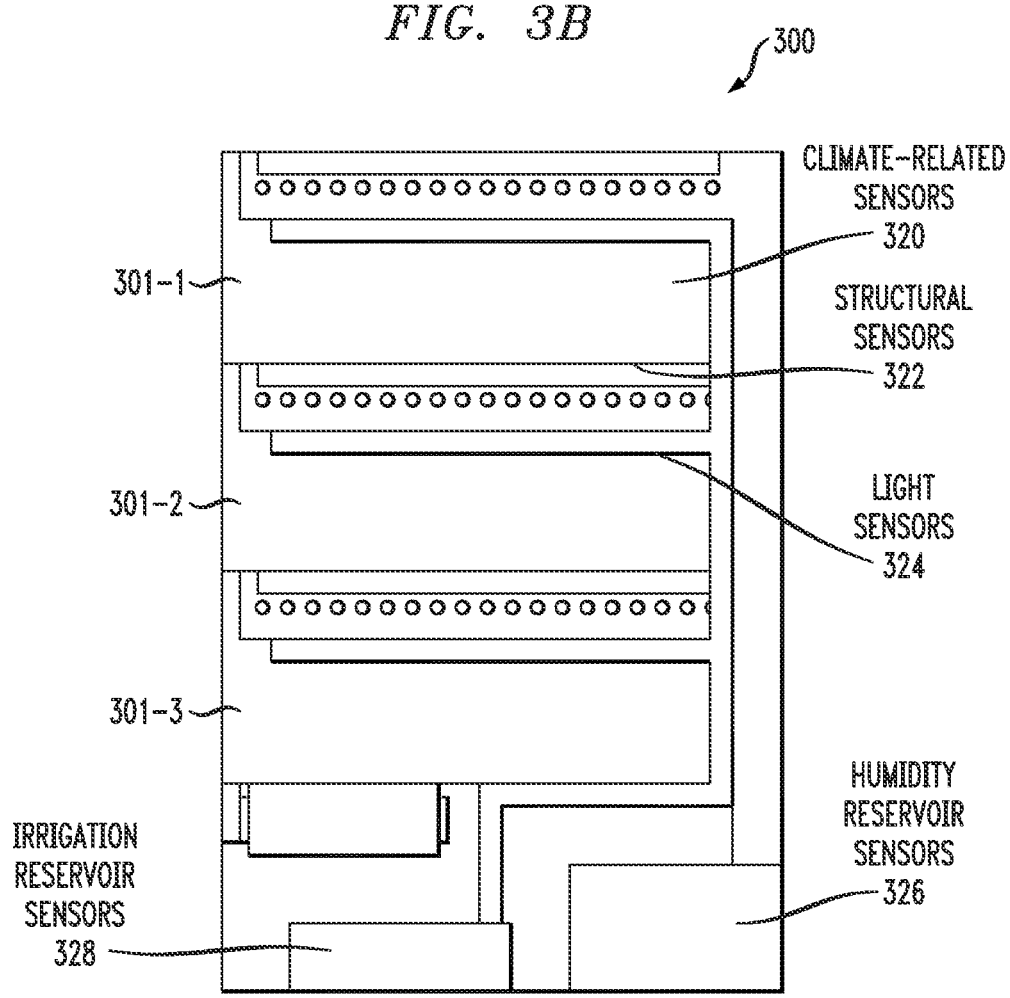

DISTRIBUTED FARMING SYSTEM AND COMPONENTS THEREOF

CROSS-REFERENCE TO RELATED APPLICATIONS

The present application is a continuation of U.S. patent application Ser. No. 16/048,965, filed Jul. 30, 2018, entitled "Distributed Farming System and Components Thereof," and claims priority to U.S. Provisional Application Ser. No. 62/539,098, filed Jul. 31, 2017, both of which are incorporated by reference herein.

FIELD

The field relates generally to information technology, and more particularly to techniques for agricultural-related technologies.

BACKGROUND

Traditional farms face increasing challenges in providing fresh produce at reasonable costs to expanding consumer bases. Such challenges can be caused, for example, by distribution issues, pricing variability, and inconsistency of the farmer and/or agricultural parameters.

Accordingly, a need exists for techniques and/or mechanisms for generating produce more efficiently, particularly with respect to geographic and meteorological constraints faced by traditional farms.

SUMMARY

Illustrative embodiments of the invention provide a distributed farming system and components thereof. An exemplary computer-implemented method can include facilitating transfer of one or more items of produce, at approximately a given stage of a growth cycle of the one or more items of produce, from (i) a first location to (ii) one or more remote growing units, wherein the given stage of the growth cycle comprises a stage prior to completion of the growth cycle. Such a method can also include analyzing data, captured via multiple sensors within the one or more remote growing units, wherein the data comprise (i) data pertaining to the one or more items of produce and (ii) data pertaining to the one or more remote growing units, and wherein the analyzing is carried out by at least one centralized server communicatively linked to the one or more remote growing units. Further, such a method can additionally include transmitting, via the at least one centralized server to the one or more remote growing units, one or more instructions pertaining to an adjustment to at least one of multiple growing parameters within the one or more remote growing units, wherein the transmitting is based at least in part on the analyzing of the data, and wherein the transmitting occurs during one or more stages of the growth cycle that is between (i) the given stage and (ii) completion of the growth cycle.

In another embodiment of the invention, a system can include at least one centralized server comprising at least one processor operably coupled to a memory, and multiple distributed devices, each comprising at least one processor operably coupled to a memory, wherein each of the multiple distributed devices comprises a collection of one or more sensors, and wherein each of the multiple distributed devices is connected to the at least one centralized server via a network. In such a system, the multiple distributed devices automatically transmit data, captured via the collection of one or more sensors, to the at least one centralized server, wherein the data comprise information related to growth of one or more items of produce within the multiple distributed devices. Additionally, in such a system, the at least one centralized server automatically transmits one or more instructions to one or more of the multiple distributed devices based at least in part on the data transmitted from the multiple distributed devices.

These and other illustrative embodiments described herein include, without limitation, methods, apparatus, networks, systems and processor-readable storage media.

BRIEF DESCRIPTION OF THE DRAWINGS

FIG. 3A is a system diagram of a miniature farm, in accordance with an example embodiment of the invention;

FIG. 3B is a system diagram of a miniature farm, in accordance with an example embodiment of the invention;

DETAILED DESCRIPTION

As detailed herein, one or more embodiments of the invention include generating and providing a distributed farming system and use of components thereof. By way of illustration, a traditional farm can commonly include acres of physical farmland and/or greenhouse space used to grow produce. In contrast, a distributed farming system and/or network can include utilization of the same amount of total physical farm space, but breaking-up such space across multiple users via networked miniature farms (also referred to herein as "mini-farms"). As used herein, miniature farms (or mini-farms) refer to distinct growing units for one or more crops, wherein such growing units can be automated and/or remotely-managed.

Illustrative embodiments of the invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
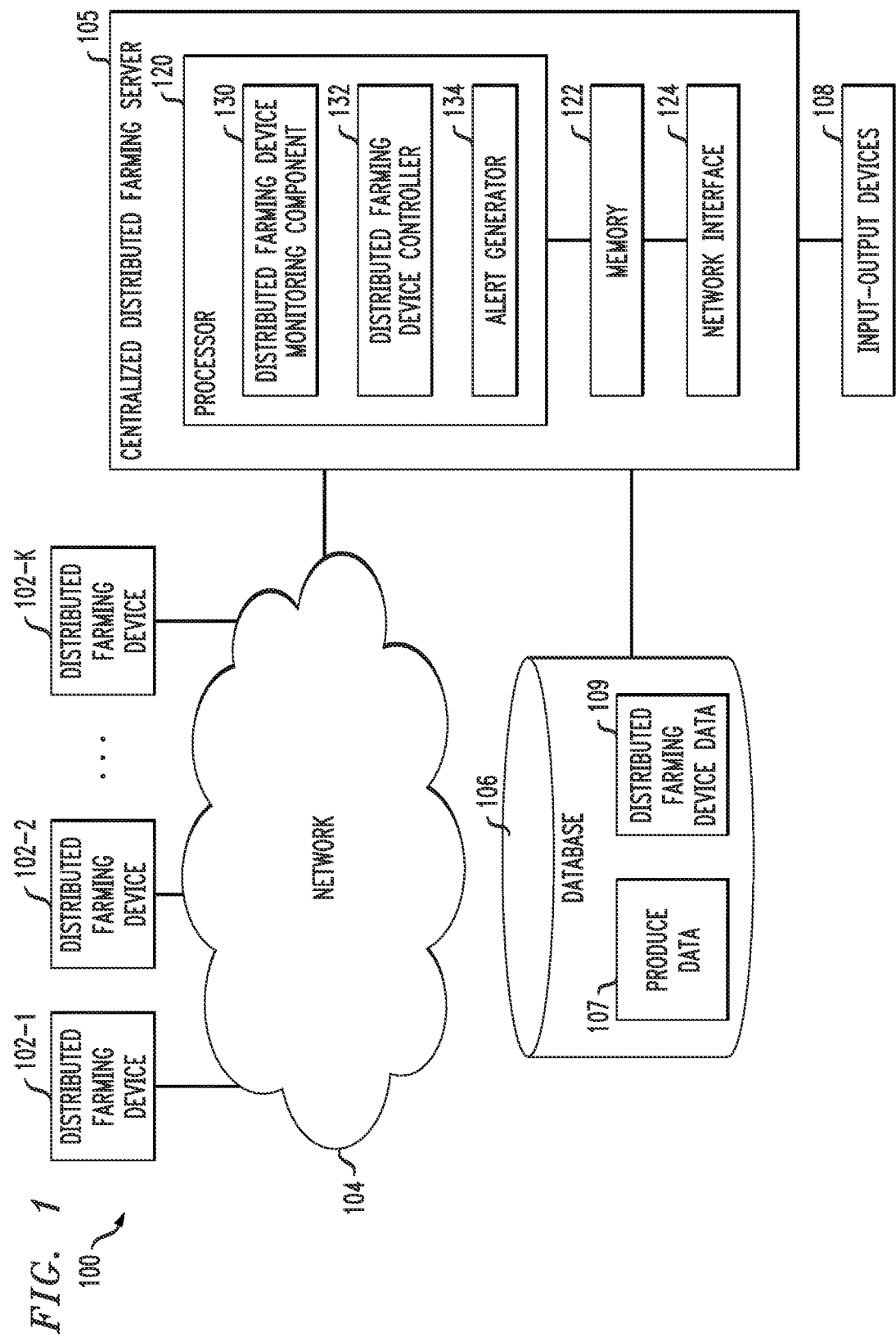
FIG. 1 is a block diagram of a computer network configured for distributed farming in an illustrative embodiment of the invention.

FIG. 1 shows a computer network 100 configured in accordance with an illustrative embodiment of the invention. The computer network 100 comprises a plurality of distributed farming devices 102-1, 102-2, . . . 102-K, collectively referred to herein as distributed farming devices 102. The distributed farming devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a centralized distributed farming server 105.

The distributed farming devices 102 may comprise, for example, automated mini-farms or other remotely-managed growing units (such as, for example, depicted in FIG. 2), which are located at end-user-related locations (and remote from a centralized distributed farming growing hub). The distributed farming devices 102 may also comprise, for example, growing units located at a centralized distributed farming growing hub. The distributed farming devices 102, as illustrated in FIG. 1, connect (wirelessly or via a hard-wired connection) to the centralized distributed farming server 105 via network 104. Accordingly, an example embodiment of the invention such as depicted in FIG. 1 includes distributing a growing area across multiple users (via the distributed farming devices), whereby the users effectively host a portion of the growing area on-site.

Also, one or more embodiments of the invention can include remotely operating farms on-site at the user location. In such an embodiment, a growing unit/device is installed at a user-determined location, and subsequently remotely operated and managed by one or more humans and/or servers via the internet and/or a network interface. One or more such embodiments can include remote growing of one or more crops via the use of sensors, automation, and communication connectivity to a centralized server.

Referring again to FIG. 1, in one or more embodiments of the invention, each distributed farming device 102 is assumed to be implemented using at least one processing device. Each such processing device generally comprises at least one processor and an associated memory, and implements one or more functional modules for controlling certain features of the distributed farming device 102. Also, in at least one embodiment of the invention, each distributed farming device 102 is coupled to a power source and one or more water hook-ups.

Additionally, the distributed farming devices 102 can be coupled to one or more additional devices such as mobile telephones, laptop computers, tablet computers, desktop computers or other types of computing devices.

The distributed farming devices 102 in some embodiments are coupled to respective computers associated with a particular company, organization or other enterprise. Numerous other operating scenarios involving a wide variety of different types and arrangements of processing devices and networks are possible, as will be appreciated by those skilled in the art.

Also, it is to be appreciated that the term "user" herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, a 4G network, or various portions or combinations of these and other types of networks. The computer network 100 in some embodiments therefore comprises combinations of multiple different types of networks, each comprising processing devices configured to communicate using internet protocol (IP) or other related communication protocols.

The centralized distributed farming server 105 has an associated database 106 configured to store data related to distributed farming. The database 106 more particularly stores produce data 107, which illustratively comprise produce-specific information (such as, for example, various growing parameters and acceptable values thereof), as well as distributed farming device data 109, which illustratively comprise device- or user-specific information (such as further described herein).

The database 106 in the present embodiment can be implemented using one or more storage systems associated with the centralized distributed farming server 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the centralized distributed farming server 105 are input-output devices 108, which illustratively comprise keyboards, displays or other types of input-output devices in any combination. Such input-output devices are used to support one or more user interfaces to the centralized distributed farming server 105, as well as to support communication between the centralized distributed farming server 105 and other related systems and devices not explicitly shown.

The centralized distributed farming server 105 in the FIG. 1 embodiment is assumed to be implemented using at least one processing device. Each such processing device generally comprises at least one processor and an associated memory, and implements one or more functional modules for controlling certain features of the centralized distributed farming server 105.

More particularly, the centralized distributed farming server 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the invention can also include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the centralized distributed farming server 105 to communicate over the network 104 with the distributed farming devices 102, and illustratively comprises one or more conventional transceivers.

The processor 120 further comprises a distributed farming device monitoring component 130, a distributed farming device controller 132, and an alert generator 134.

It is to be appreciated that this particular arrangement of modules 130, 132 and 134 illustrated in the processor 120 of the FIG. 1 embodiment is presented by way of example only, and alternative arrangements can be used in other embodiments. For example, the functionality associated with the modules 130, 132 and 134 in other embodiments can be combined into a single module, or separated across a larger number of modules. As another example, multiple distinct processors can be used to implement different ones of the modules 130, 132 and 134 or portions thereof.

Also, at least portions of the distributed farming device monitoring component 130, distributed farming device controller 132, and alert generator 134 may be implemented at least in part in the form of software that is stored in memory 122 and executed by processor 120.

It is to be understood that the particular set of elements shown in FIG. 1 for distributed farming involving distributed farming devices 102 of computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the centralized distributed farming server 105 can be eliminated and associated elements such as distributed farming device monitoring component 130, distributed farming device controller 132, and alert generator 134 can be implemented elsewhere in the computer network 100.

An exemplary process utilizing distributed farming device monitoring component 130, distributed farming device controller 132, and alert generator 134 of the centralized distributed farming server 105 in computer network 100 will be described below, as well as in additional detail in connection with the flow diagram of FIG. 5.

At least one embodiment of the invention includes providing an end-user and/or distribution center with an automated mini-farm (such as, for example, device 102 in FIG. 1) to be installed at the end-user/distribution center location (remote from a centralized distribution farming growing hub). Such end-users and/or distribution centers can include, for example, restaurants, individuals at residential or commercial locations, grocery stores, markets, and/or distributors. The end-users and/or distribution centers can also request one or more specific types of produce to ultimately be grown and harvested from the provided mini-farm. Such types of produce, by way merely of example and not limitation, can include one or more varieties of mushrooms, one or more varieties of herbs, one or more varieties of leafy greens, as well as other types of fruits and vegetables.

Additionally, growing units (such as, for example, device 102 in FIG. 1), located at a centralized distributed farming growing hub, can be utilized for one or more initial stages of growing the desired produce. These centralized growing units interact with a centralized distributed farming server (such as, for example, device 105 in FIG. 1) to carry out one or more initial stages of produce growth. By way of example, in connection with the growing units, sawdust, one or more nutrients, and one or more sterilization tools can be utilized to carry out the initial stages of produce growth. Upon reaching the desired stage of growth, the living produce is physically transferred from the growing units located at the centralized distributed farming growing hub to one or more mini-farms located on-site at one or more end user locations, where the produce is grown to the final stage of growth. By way of example, produce can be grown in a centralized growing unit to a point of approximately 75% completion (that is, 75% of the lifecycle towards harvesting), at which point the living produce is then transferred to one or more mini-farms at the end-user location, where the remaining approximately 25% of growth (as well as the act of harvesting) can occur. In such an example, by growing produce 75% of the way (towards harvesting) and then distributing the produce out to one or more networked mini-farms, one or more embodiments of the invention include the ability to maintain strict quality control, increase farm productivity, and limit the space required for each on-site mini-farm.

Further, in at least one embodiment of the invention, end-users can subscribe to the above-described service, wherein such a subscription can include scheduled and/or periodic deliveries of colonized substrate and pre-grown crops to the end-user (to be placed inside of the corresponding mini-farm(s)). The crops then finish the growth cycle in the end-user's mini-farm, at which point the end-user can harvest the fresh produce at his or her discretion.

Also, in one or more embodiments of the invention, devices or growing units (such as devices 102 in FIG. 1) can disconnect from the centralized server (105 in FIG. 1, for example) and involuntarily go offline and still be periodically provided updates from the server. In such an embodiment, the server can push one or more updates to device via periodic connections. For example, such an update can include growing parameters for a new/different crop that the user wishes to grow in the unit.

Additionally, in at least one embodiment of the invention, baseline parameters for growing a particular crop are pre-installed (by server 105, for example) in a device (such as device 102 in FIG. 1). Subsequently, the device can maintain a connection to the server via a network (via Wi-Fi, for example), and the server can collect data from the device (as further detailed herein). If the network connectivity is interrupted, however, the device can store data locally until the connection is restored with the server or until such time that the device self-deletes the storage.

Figure 2:
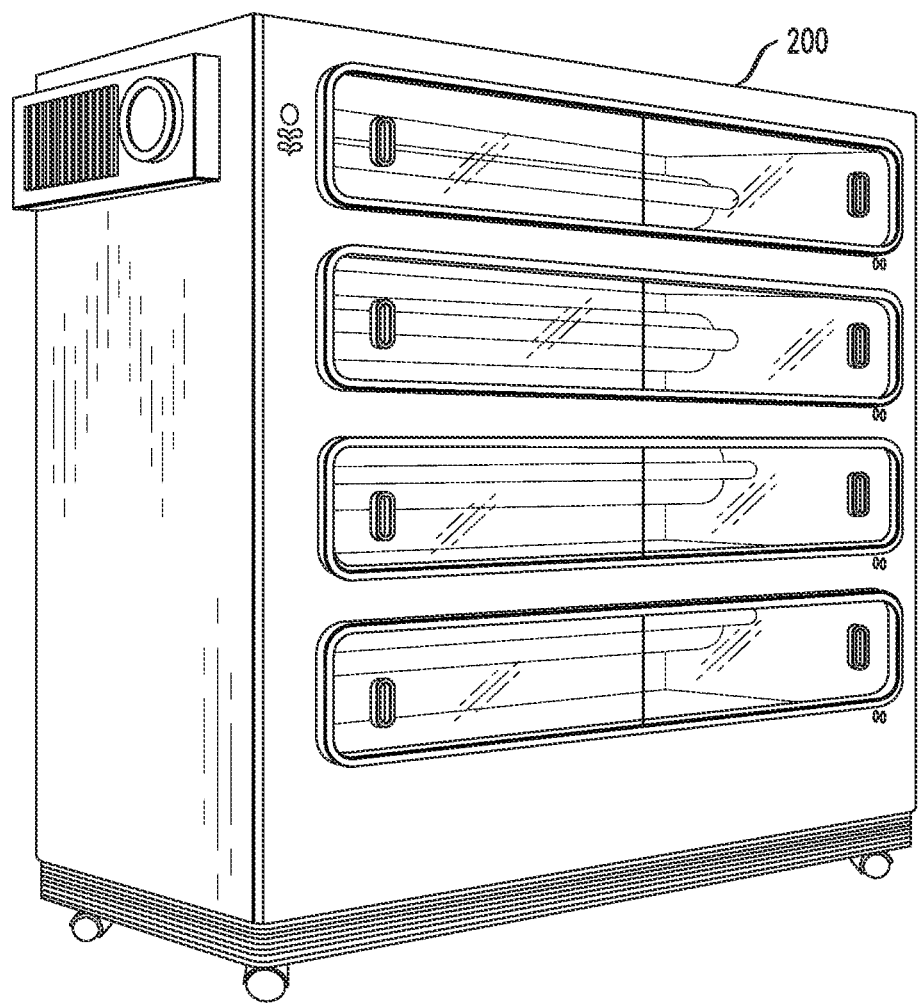
FIG. 2 is an exterior view of a miniature farm, in accordance with an example embodiment of the invention.

FIG. 2 is an exterior view of a miniature farm 200 (which can represent an example of distributed farming device 102 in FIG. 1), in accordance with an example embodiment of the invention. It is to be appreciated that growing units located at a centralized distributed farming growing hub contain features and components similar to those depicted in the miniature farm 200. It is also to be appreciated that the miniature farm 200 depicted in FIG. 2 is merely an example, and multiple alternative designs can be implemented in connection with one or more embodiments of the invention.

Accordingly, by way of merely of illustration, FIG. 2 depicts a networked miniature farm 200 that includes a contained-environment plant production system. In one or more embodiments of the invention, networked mini-farms (such as mini-farm 200) are climate-controlled vertical farms, applying advanced lighting and water recirculation to high-density growth chambers. The unit itself can be enclosed and controlled by a custom sensor suite, which is networked and monitored remotely by technicians and/or a centralized server to ensure proper functionality.

FIG. 3A is a system diagram of a miniature farm 300 (which can represent an example of distributed farming device 102 in FIG. 1), in accordance with an example embodiment of the invention. By way of illustration, FIG. 3A depicts callouts of example miniature farm 300 that include one or more vent tubes 302, one or more irrigation tubes 304 (which can, by way merely of example, carry out multiple methods of hydroponics), an air filter device 306, an irrigation component 308, an air control reservoir (related to controlling humidity) 310 and an irrigation reservoir 312. Additionally, at least one embodiment of the invention can include implementing an air handling and/or air filtration system (such as further detailed herein) that can be scaled for implementation in larger and/or commercial farming environments.

More specifically, ventilation (vent) tubes 302 are used to distribute conditioned air into the shelves/compartments 301-1, 301-2 and 301-3 (collectively, shelves 301) of the miniature farm 300, and push air throughout the enclosure (of miniature farm 300). In one or more embodiments of the invention, air pushed through the vent tubes 302 can be humidified, dehumidified, heated, cooled, or injected with various gases to ensure and/or facilitate proper growth of the crop/produce within the miniature farm 300, and/or to clean the miniature farm 300, if necessary. The type of air that is distributed through the vent tubes 302 can be monitored and/or controlled by one or more sensors placed throughout the miniature farm 300, ensuring that the appropriate amount and/or type of air is being provided through the system. Additionally, at least one embodiment of the invention can also include implementation of one or more fans throughout the vent tubes 302 to ensure and/or facilitate an appropriate level of air pressure therein, and such fans can include one or more electronic valves that can control distribution to an even finer level.

As also depicted in FIG. 3A, irrigation tubes 304 are implemented to carry water used to irrigate the crop/produce within the miniature farm 300, as necessary. Such water can be, for example, fresh water or fertigated water, depending on the crop/produce being grown in the miniature farm 300. Also, such water can also be used, for example, to carry one or more cleaning agents, when necessary. In one or more embodiments of the invention, irrigation can be provided to the miniature farm 300 via a mechanical pump, which is pressurized when running. Such irrigation can be distributed from the irrigation tubes 304 via one or more misters, tubes, or any other type of plumbing.

Additionally, as noted above, FIG. 3A depicts air filter device 306, which is used to filter air from within the miniature farm 300 as well as outside the miniature farm 300, to create and/or ensure a clean air environment within the miniature farm 300. The air filter device 306 can use, for example, various types of filters that can filter out spores, dust, and/or random particulate matter that may harm the miniature farm 300 and/or crop/produce growth therein.

Also, as depicted in FIG. 3A, irrigation component 308, which can include, for example, a hydroponic irrigation component, is used to hydrate blocks, produce, soil, substrate, etc., inside of the miniature farm 300. Additionally, irrigation reservoir 312 can hold water that is used to supply the irrigation tubes 304. Such water can be pumped, by a mechanical pump, for example, from the irrigation reservoir 312 to the irrigation tubes 304, and the chemistry of the water can be managed through one or more sensors and/or one or more fertigation pumps, as necessary. Also, in one or more embodiments of the invention, the irrigation reservoir 312 can have automatic nutrient dosing and chemistry control through one or more sensors and/or pumps.

Further, as also depicted in FIG. 3A, air control reservoir 310 is implemented to hold water that is used to humidify air that is sent through the miniature farm 300. In at least one embodiment of the invention, the air control reservoir 310 can use one or more types of humidification techniques (including, for example, the use of ultrasonic foggers). Also, in one or more embodiments of the invention, the air in the air control reservoir 310 can be cooled before it is sent to the rest of the miniature farm 300 via the vent tubes 302.

FIG. 3B is a system diagram of miniature farm 300, in accordance with an example embodiment of the invention. By way of illustration, FIG. 3B depicts sensors of the example miniature farm 300 that include one or more climate-related sensors 320. Such climate-related sensors 320 can include, for example, carbon dioxide ($CO_2$) sensors, air temperature sensors, $O_2$ sensors, and/or humidity sensors. FIG. 3B also depicts one or more structural sensors 322, wherein such structural sensors 322 can include, for example, weight (of the crop) sensors, visual sensors (such as cameras, sonar, etc.), and/or door sensors (to determine whether a door of the miniature farm 300 is open or closed). Additionally, FIG. 3B depicts light sensors 324, wherein such light sensors 324 can include, for example, photosynthetic active radiation (PAR) sensors, and/or ON/OFF sensors (in connection with one or more lighting mechanisms within the miniature farm 300). FIG. 3B also depicts humidity reservoir sensors 326, which can include water level sensors, and irrigation reservoir sensors 328. Such irrigation reservoir sensors 328 can include, for example, pH sensors, electrical conductivity (EC) sensors, oxidation reduction potential (ORP) sensors, water temperature sensors, and/or water level sensors. Further, in at least one embodiment of the invention, an example miniature farm such as farm 300 can also include additional sensors such as Wi-Fi ON/OFF sensors, and power ON/OFF sensors.

Accordingly, an example mini-farm can be outfitted with Wi-Fi, allowing a server and/or human experts/growers at remote locations (such as, for example, a centralized hub) to monitor and control the mini-farm remotely. By way merely of example and not limitation, example mini-farms can have dimensions such as two feet by four feet, three feet by six feet, three feet by twelve feet, and/or dimensions analogous to a standard shipping container.

Also, in at least one embodiment of the invention, one or more growth and/or climate parameters within the mini-farm can be monitored and updated remotely by a centralized server. Similarly, the mini-farms can provide periodic and/or continuous data to the centralized server. By way of example and not limitation, such data can include $CO_2$ data, air temperature data, $O_2$ data, humidity data, device shelf weight, visual data (for computer vision), sonar data (to determine the distance of the crop from a sensor, for example), electro-conductivity of the substrate, pH of the substrate, opening and/or shutting of device doors, water reservoir electro-conductivity, water reservoir pH, water reservoir oxygen reduction potential, water reservoir temperature, PAR of lights, water level, power on/off, Wi-Fi on/off, etc.

In one or more embodiments of the invention, given that the mini-farm is a controlled environment, no pesticides are required. In at least one embodiment of the invention, compostable, organic growing media and substrate are provided in the mini-farm with the nearly fully-grown produce, and no produce packaging outside of delivery containers is generated or required. That said, in one or more embodiments of the invention, specialized delivery containers to transport living produce from a centralized growing hub to distributed growing units can be implemented and/or utilized in order to optimize the distributed farming process detailed herein.

Figure 4:
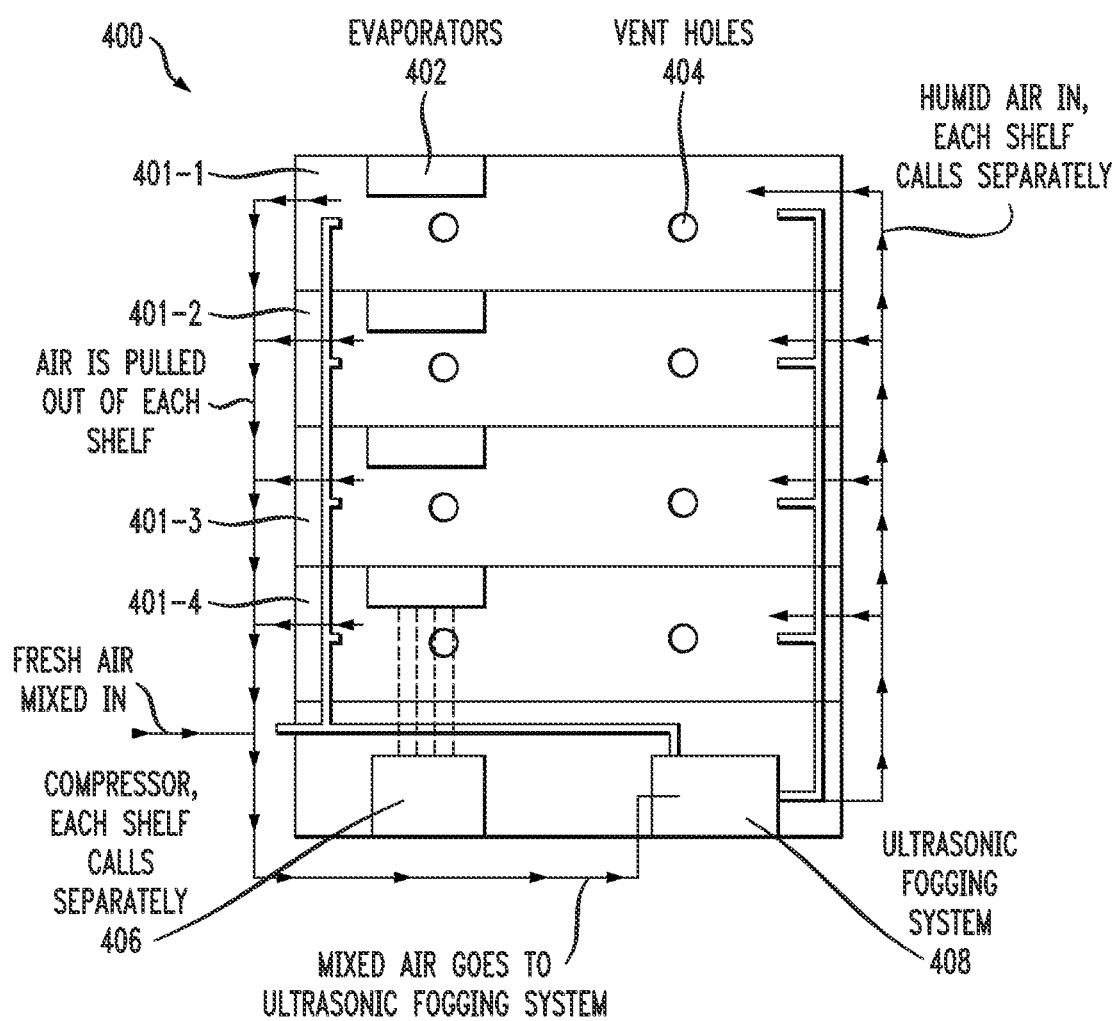
FIG. 4 is a system diagram of a miniature farm, in accordance with an example embodiment of the invention.

FIG. 4 is a system diagram of a miniature farm 400 (which can represent another example of distributed farming device 102 in FIG. 1), in accordance with an example embodiment of the invention. By way of illustration, FIG. 4 depicts evaporator components 402, ventilation (vent) holes 404, a compressor 406, and an ultrasonic fogging (humidification) system 408. As also depicted in FIG. 4, air is extracted from each of the shelves 401-1, 401-2, 401-3 and 401-4 (collectively, shelves 401) in the miniature farm 400, and fresh and/or externally-provided air is mixed with this extracted air. This mixed air can then be provided to the humidification system (that is, the ultrasonic fogging system 408), which then outputs humid air, which is provided to each shelf 401 via individual and/or separate calls.

Additionally, 402 when the miniature farm 400 requires in-shelf temperature control, evaporators 402 are used to control the temperature. The evaporators 402 can include cooling coils with evaporator fans to draw excess heat from each shelf 401 in the miniature farm 400. Additionally, such evaporators 402 can include drains that direct collected water from the cooling process into a humidification reservoir, and each evaporator can be controlled independently. Also, compressor 406 is utilized to draw heat from the evaporators 402. In one or more embodiments of the invention, the compressor 406 and evaporators 402 can be wired in such a way that allows each shelf 401 of the miniature farm 400 to be controlled independently.

As also depicted in FIG. 4, vent holes 404 can be implemented throughout the miniature farm 400 to allow the miniature farm 400 to vent air when necessary. Such venting can be carried out, for example, passively or through one or more fans connected to each vent hole 404.

Additionally, as depicted in FIG. 4, ultrasonic fogging system (foggers) 408 can be used to atomize the water in an air handling reservoir to provide one or more levels of humidity into the miniature farm 400. By way of example, in at least one embodiment of the invention, the ultrasonic fogging system 408 is activated and/or turned on only when called for by the sensor suite of the miniature farm 400.

Figure 5:
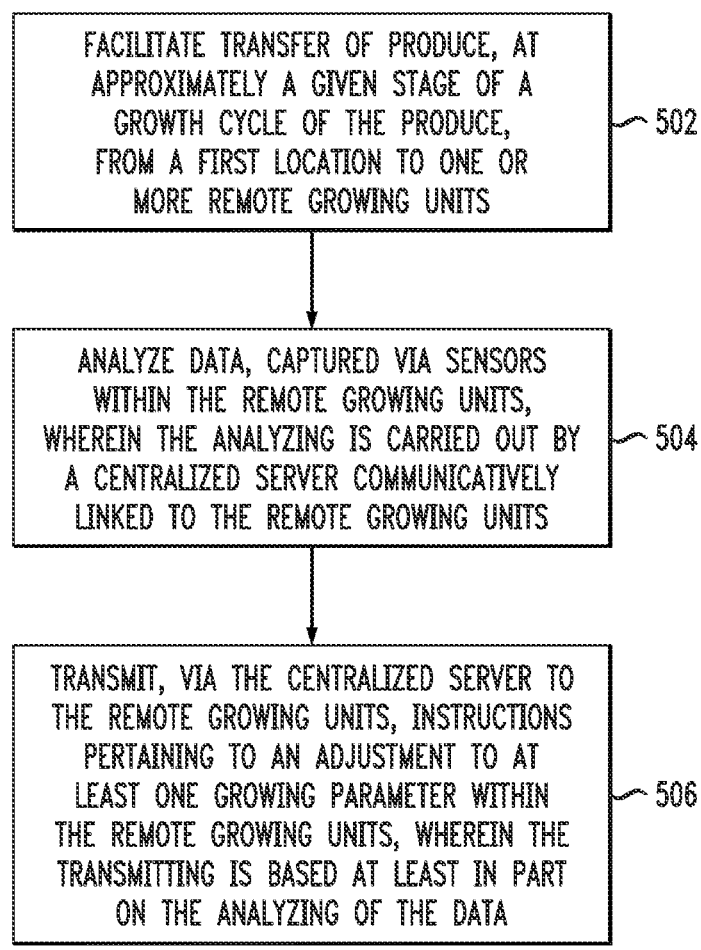
FIG. 5 is a flow diagram of a process for distributed farming in an illustrative embodiment of the invention.

FIG. 5 is a flow diagram of a process for distributed farming in an illustrative embodiment of the invention. In this embodiment, the process includes steps 502 through 506. These steps are assumed to be performed by the processor 120 utilizing its modules 130, 132 and 134.

Step 502 includes facilitating transfer of one or more items of produce, at approximately a given stage of a growth cycle of the one or more items of produce, from (i) a first location to (ii) one or more remote growing units, wherein the given stage of the growth cycle comprises a stage prior to completion of the growth cycle. The one or more items of produce can include, for example, one or more varieties of mushrooms, one or more varieties of herbs, one or more types of fruits, and/or one or more types of vegetables.

Step 504 includes analyzing data, captured via multiple sensors within the one or more remote growing units, wherein the data comprise (i) data pertaining to the one or more items of produce and (ii) data pertaining to the one or more remote growing units, and wherein the analyzing is carried out by at least one centralized server communicatively linked to the one or more remote growing units. Such a step can be carried out, for example, by distributed farming device monitoring component 130 in the FIG. 1 embodiment of the invention.

Analyzing the data can include tracking, over one or more stages of the growth cycle, one or more items of data pertaining to the one or more items of produce. Additionally, analyzing the data can include tracking, over a given temporal interval, one or more items of data pertaining to the one or more remote growing units. Also, analyzing the data can include processing, by the at least one centralized server, the captured data from the one or more remote growing units on a periodic basis and/or on a continuous basis.

The multiple sensors can include one or more climate-related sensors, such as, for example, one or more $CO_2$ sensors, one or more air temperature sensors, one or more $O_2$ sensors, and/or one or more humidity sensors. The multiple sensors can also include one or more structural sensors, such as, for example, one or more weight sensors, one or more visual sensors, and/or one or more door sensors. Also, the multiple sensors can include one or more light-related sensors, such as, for example, one or more photosynthetic active radiation sensors. Further, the multiple sensors can include one or more humidity reservoir sensors, such as, for example, one or more water level sensors, one or more irrigation reservoir sensors, one or more pH sensors, one or more electrical conductivity sensors, one or more oxidation reduction potential sensors, one or more water temperature sensors, and/or one or more water level sensors.

Step 506 includes transmitting, via the at least one centralized server to the one or more remote growing units, one or more instructions pertaining to an adjustment to at least one of multiple growing parameters within the one or more remote growing units, wherein the transmitting is based at least in part on the analyzing of the data, and wherein the transmitting occurs during one or more stages of the growth cycle that is between (i) the given stage and (ii) completion of the growth cycle. Such a step can be carried out, for example, by distributed farming device controller 132 in the FIG. 1 embodiment of the invention.

In one or more embodiments of the invention, the one or more instructions cause the adjustment to the at least one growing parameter to be carried out automatically by the one or more remote growing units. Additionally, transmitting the one or more instructions can include pushing, via the at least one centralized server, one or more updates to the one or more remote growing units via periodic connections.

At least one or more embodiments of the invention can also include growing the one or more items of produce through the given stage of the growth cycle, and/or contracting, with a third-party grower/farmer, to grow the one or more items of produce through the given stage of the growth cycle.

Additionally, in one or more embodiments of the invention, the remote growing units can execute algorithms to automatically test one or more parameters (within the remote growing units) and/or yield of the one or more items of produce, and transmit (push) the test results to the at least one centralized server. Based on such results, the at least one centralized server and/or the remote growing units can learn improved and/or optimized growing conditions/parameters within the remote growing units for particular items of produce.

In another embodiment of the invention, a system can include at least one centralized server comprising at least one processor operably coupled to a memory, and multiple distributed devices, each comprising at least one processor operably coupled to a memory, wherein each of the multiple distributed devices comprises a collection of one or more sensors, and wherein each of the multiple distributed devices is connected to the at least one centralized server via a network.

In such a system, the multiple distributed devices automatically transmit data, captured via the collection of one or more sensors, to the at least one centralized server, wherein the data comprise information related to growth of one or more items of produce within the multiple distributed devices. The information related to growth of the one or more items of produce can include, for example, yield-related information, information pertaining to one or more environmental parameters within one or more of the multiple distributed devices, and/or information pertaining to one or more device parameters associated with one or more of the multiple distributed devices. Also, the data captured via the collection of sensors can include image data. Further, in one or more embodiments of the invention, one or more of the multiple distributed devices can automatically request information from the at least one centralized server.

Additionally, in such a system, the at least one centralized server automatically transmits one or more instructions to one or more of the multiple distributed devices based at least in part on the data transmitted from the multiple distributed devices. The one or more instructions can include, for example, one or more instructions to automatically modify one or more environmental parameters within the one or more distributed devices.

In at least one embodiment of the invention, such a system can be a self-learning system, in that the system can, for example, perform tests and learn from yields, experiments, mistakes, etc. Additionally, such a system, via the collection of sensors, can track a variety of data (as detailed herein), including yield, images, user interaction, etc.

Numerous other techniques can be used in association with one or more embodiments of the invention. Accordingly, the particular processing operations and other network functionality described in conjunction with the flow diagram of FIG. 5 are presented by way of illustrative example only, and should not be construed as limiting the scope of the invention in any way. For example, the ordering of the process steps may be varied in other embodiments, or certain steps may be performed concurrently with one another rather than serially. Also, as indicated previously, the process steps or subsets thereof may be repeated periodically in conjunction with respective distinct instances of distributed farming techniques with respect to different users.

By way of example, in one or more additional embodiments of the invention, the distributed farming devices (such as devices 102 in FIG. 1) can be replaced with sensor suites having the ability to communicate with a centralized server (such as server 105 in FIG. 1).

The above-described illustrative embodiments provide significant advantages relative to conventional approaches. For example, some embodiments are configured to provide produce harvested on-site at an end-user's location, limiting travel effects. Additionally, one or more embodiments include utilizing significantly less water than traditional farming, and less energy than traditional cold storage techniques.

It is to be appreciated that the foregoing advantages are illustrative of advantages provided in certain embodiments, and need not be present in other embodiments.

The computer networks disclosed herein are illustratively implemented using one or more processing platforms, examples of which will now be described in greater detail. A given such processing platform comprises at least one processing device comprising a processor coupled to a memory.

In some embodiments, portions of a computer network as disclosed herein illustratively comprise cloud infrastructure. The cloud infrastructure in some embodiments comprises a plurality of containers implemented using container host devices. More particularly, the cloud infrastructure in one or more illustrative embodiments comprises container-based virtualization infrastructure configured to implement Docker containers or other types of Linux containers (LXCs).

The cloud infrastructure may additionally or alternatively comprise other types of virtualization infrastructure such as virtual machines implemented using a hypervisor. The underlying physical machines may comprise one or more distributed processing platforms that include one or more storage systems.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a 4G network, Wi-Fi or WiMAX network, or various portions or combinations of these and other types of networks.

Each processing device of the processing platform comprises a processor coupled to a memory. The processor may comprise a microprocessor, a microcontroller, an ASIC, an FPGA or other type of processing circuitry, as well as portions or combinations of such circuitry elements. The memory may comprise RAM, ROM or other types of memory, in any combination. The memory and other memories disclosed herein should be viewed as illustrative examples of what are more generally referred to as "processor-readable storage media" storing executable program code of one or more software programs.

As indicated above, articles of manufacture and other computer program products comprising such processor-readable storage media are considered embodiments of the present invention.

As another processing platform example, portions of a given processing platform in some embodiments can comprise converged infrastructure.

The particular processing platforms described above are presented by way of example only, and a given computer network such as computer network 100 may include additional or alternative processing platforms, as well as numerous distinct processing platforms in any combination, with each such platform comprising one or more computers, servers, storage devices or other processing devices.

Processing devices and other computer network components can communicate with one another using a variety of different communication protocols and associated communication media.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of components and parameters can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A computer-implemented method comprising:
   facilitating transfer of one or more substrates and one or more crops at approximately a given stage of a growth cycle, from (i) a first location to (ii) one or more growing units, wherein the given stage of the growth cycle comprises a stage prior to completion of the growth cycle;

processing data, captured via multiple sensors within the one or more growing units, wherein the data comprise (i) data pertaining to at least one of the one or more substrates and the one or more crops, and (ii) data pertaining to the one or more growing units, wherein the multiple sensors comprise climate-related sensors comprising at least three of (a) one or more carbon dioxide ($CO_2$) sensors, (b) one or more air temperature sensors, (c) one or more $O_2$ sensors, and (d) one or more humidity sensors; and performing one or more automated actions based at least in part on the processing of the data.

2. The computer-implemented method of claim 1, wherein performing the one or more automated actions comprises transmitting one or more instructions to cause an adjustment to at least one growing parameter to be carried out automatically by the one or more growing units.

3. The computer-implemented method of claim 2, wherein transmitting the one or more instructions comprises pushing, via at least one centralized server, one or more updates to the one or more growing units via periodic connections.

4. The computer-implemented method of claim 1, wherein processing the data comprises tracking, over one or more stages of the growth cycle, one or more items of data pertaining to the one or more crops.

5. The computer-implemented method of claim 1, wherein processing the data comprises tracking, over a given temporal interval, one or more items of data pertaining to the one or more growing units.

6. The computer-implemented method of claim 1, wherein the multiple sensors comprise one or more structural sensors.

7. The computer-implemented method of claim 6, wherein the one or more structural sensors comprise at least one of (i) one or more weight sensors, (ii) one or more visual sensors, and (iii) one or more door sensors.

8. The computer-implemented method of claim 1, wherein the multiple sensors comprise one or more light-related sensors.

9. The computer-implemented method of claim 8, wherein the one or more light-related sensors comprise one or more photosynthetic active radiation sensors.

10. The computer-implemented method of claim 1, wherein the multiple sensors comprise one or more humidity reservoir sensors.

11. The computer-implemented method of claim 10, wherein the one or more humidity reservoir sensors comprise at least one of (i) one or more water level sensors, (ii) one or more irrigation reservoir sensors, (iii) one or more pH sensors, (iv) one or more electrical conductivity sensors, (v) one or more oxidation reduction potential sensors, (vi) one or more water temperature sensors, and (vii) one or more water level sensors.

12. The computer-implemented method of claim 1, wherein processing the data comprises processing, using at least one centralized server, the captured data from the one or more growing units on at least one of (i) a periodic basis and (ii) a continuous basis.

13. An apparatus comprising:
a memory; and
at least one processor operably coupled to the memory and configured for:
    facilitating transfer of one or more substrates and one or more crops at approximately a given stage of a growth cycle, from (i) a first location to (ii) one or more growing units, wherein the given stage of the growth cycle comprises a stage prior to completion of the growth cycle;
    processing data, captured via multiple sensors within the one or more growing units, wherein the data comprise (i) data pertaining to at least one of the one or more substrates and the one or more crops, and (ii) data pertaining to the one or more growing units, wherein the multiple sensors comprise climate-related sensors comprising at least three of (a) one or more carbon dioxide ($CO_2$) sensors, (b) one or more air temperature sensors, (c) one or more $O_2$ sensors, and (d) one or more humidity sensors; and
    performing one or more automated actions based at least in part on the processing of the data.

14. The apparatus of claim 13, wherein performing the one or more automated actions comprises transmitting one or more instructions to cause an adjustment to at least one growing parameter to be carried out automatically by the one or more growing units.

15. The apparatus of claim 13, wherein processing the data comprises tracking, over one or more stages of the growth cycle, one or more items of data pertaining to the one or more crops.

16. The apparatus of claim 13, wherein processing the data comprises tracking, over a given temporal interval, one or more items of data pertaining to the one or more growing units.

17. The apparatus of claim 13, wherein the multiple sensors comprise one or more structural sensors.

18. The apparatus of claim 13, wherein the multiple sensors comprise one or more light-related sensors.

19. The apparatus of claim 13, wherein the multiple sensors comprise one or more humidity reservoir sensors.

20. The apparatus of claim 13, wherein processing the data comprises processing, using at least one centralized server, the captured data from the one or more growing units on at least one of (i) a periodic basis and (ii) a continuous basis.

* * * * *